United States Patent
Hutchinson

[11] 4,035,716
[45] July 12, 1977

[54] SUPER COMPENSATED VOLTAGE CONTROL OF REDUNDANT D.C. POWER SUPPLIES

[75] Inventor: Homer F. Hutchinson, Wheaton, Ill.

[73] Assignee: GTE Automatic Electric Laboratories Incorporated, Northlake, Ill.

[21] Appl. No.: 672,101

[22] Filed: Mar. 31, 1976

[51] Int. Cl.² .................................................. G05F 1/64
[52] U.S. Cl. .................................. 323/20; 307/64; 307/82; 323/21; 323/25; 323/DIG. 1; 363/81
[58] Field of Search ............. 323/17, 20, 21, 22 T, 323/23, 25, DIG. 1; 307/44, 45, 51, 52, 58, 64, 77, 80, 82, 85, 87; 317/33 VR, 33 SC; 321/2, 27 R

[56] References Cited
U.S. PATENT DOCUMENTS

| | | | |
|---|---|---|---|
| 3,582,713 | 6/1971 | Till | 323/20 |
| 3,701,937 | 10/1972 | Combs | 323/20 |
| 3,796,919 | 3/1974 | Johnson | 323/20 |
| 3,809,999 | 5/1974 | Smith | 323/17 |
| 3,890,559 | 6/1975 | Kuster | 323/25 |
| 3,986,101 | 10/1976 | Koetsch et al. | 323/20 |

Primary Examiner—Gerald Goldberg

[57] ABSTRACT

A power supply system is disclosed wherein redundant D.C. power supplies are provided for a single load, each of the supplies being capable of providing full load current so that one of the supplies may be removed without interrupting power to the load. Each of the power supplies has a differential amplifier type of voltage regulator that includes a resistor in series with the output lead so that it is capable of varying the output voltage to compensate for lead and OR-ing rectifier drops.

2 Claims, 1 Drawing Figure

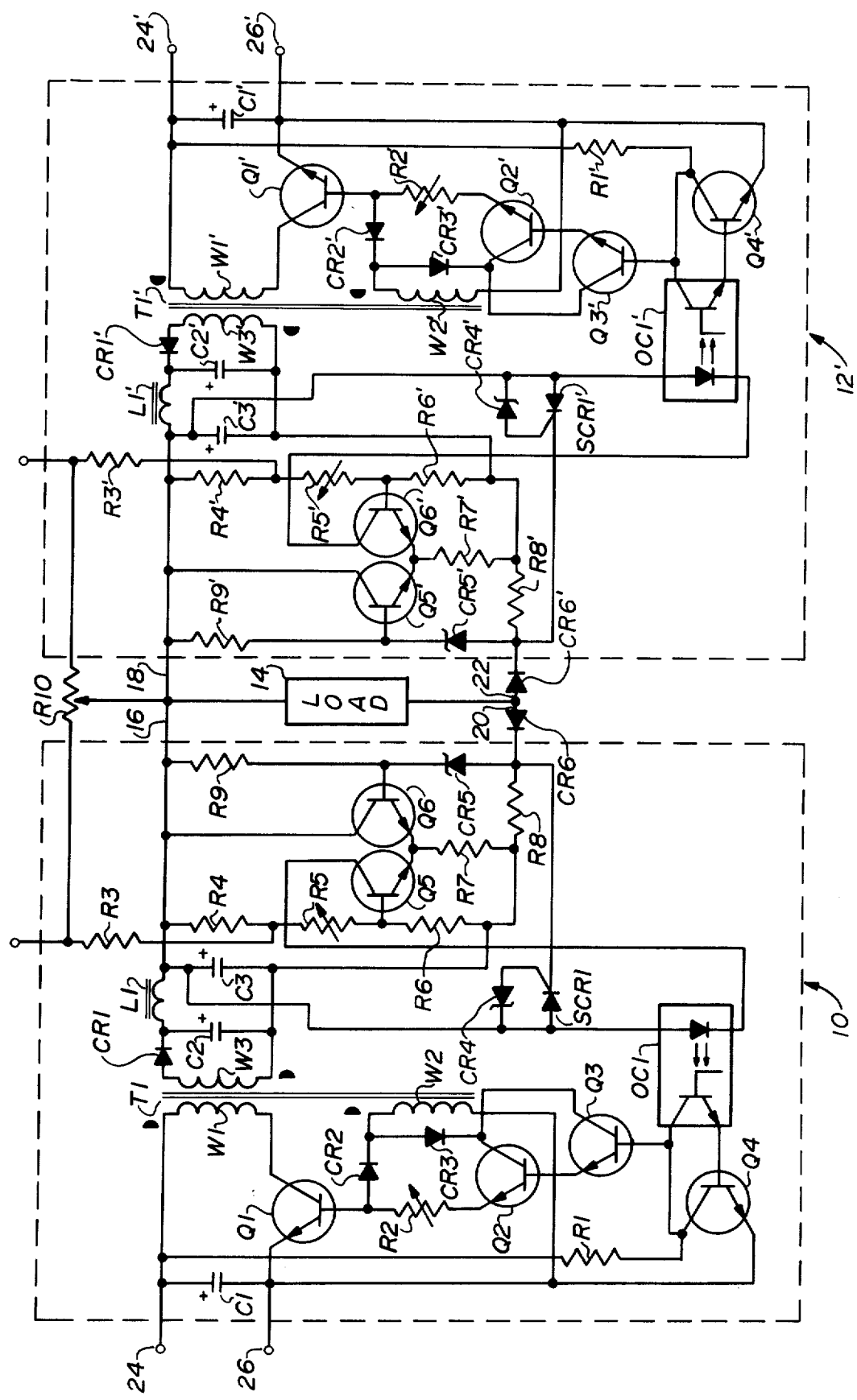

SUPER COMPENSATED VOLTAGE CONTROL OF REDUNDANT D.C. POWER SUPPLIES

BACKGROUND OF THE INVENTION

1. Field of the Invention

The present invention generally relates to a D.C. power supply system and, more particularly, to two or more D.C. power supplies which are connected to a single load to insure continuity of power to the load in the event one of the power supplies becomes inoperative.

2. Description of the Prior Art

While it is well known that multiple power supplies within a system may be connected together in parallel to increase the total output current of the power supply system in the event a single power supply would be incapable of supplying the requisite load current for a system in which it is incorporated, such parallel connected power supplies are typically not constructed so that an individual power supply may be removed without interrupting the power supplied to the load. Additionally, a system in which multiple parallel connected supplies are incorporated may require operation of all of the individual units to supply the necessary load current for the system, and if one of the power supplies becomes inoperative due to component failure or the like, the total load current may be inadequate. However, if the remaining power supplies are marginally capable of providing the required load current for the system, the increased load on the remaining supplies may result in overheating or failure of these remaining power supplies.

In an overall system which requires a continuous supply of power because of the importance of continued service, as, for example, in portions of a telephone system, or where the equipment being supplied is of such high cost that complete redundancy of the entire equipment is economically feasible, the use of redundant power supplies may be quite practical. However, in the event two or more power supplies are connected to a common load and one of the power supplies becomes inoperative, the advantage of having the second power supply would be severely diminished if the overall system was required to be shut down while the inoperative power supply was disconnected and replaced or repaired. This problem may be overcome by the use of the OR-ing or coupling diodes.

Diode OR-ing of redundant low voltage regulated converters to a common logic load presents a different, more serious problem. The forward voltage drop of a silicon rectifier is approximately 0.8 volts, or 6.67 percent for a 12 volt supply. Further, the rectifier forward voltage drop is a function of rectifier current. The use of hot carrier (Schottky) rectifiers will result in lower voltage drops, somewhat alleviating the problem.

In order to overcome the regulation problem of the rectifier drops, remote sensing could be used. Here each regulated power supply monitors the voltage across the sense point load and the bus would be accurately maintained at the proper voltages. One drawback is evident; although both regulated power converters might be initially set to the same exact voltage, one supply may eventually drift to a voltage slightly lower than the remaining supply. Under such a condition, the lower voltage regulated supply would essentially shut down, and its output voltage, on the converter side of the OR-ing rectifier would drop to a small percentage of the required output.

SUMMARY OF THE INVENTION

Accordingly, it is a primary object of the present invention to provide an improved power supply system which includes two or more power supplies connected to a common load wherein each is capable of providing the necessary power requirements and wherein power is continuously provided to the load even though one of the supplies becomes inoperative and is removed from the power supply system.

Each regulated converter is compensated for OR-ing rectifier voltage drop variations, due to converter load current changes, by means of a load current sensing resistor. This is a very practical method for developing suitably regulated redundant power for an essential load and yet being able to supervise the regulated converters with standard electronic voltage monitor channels.

Other objects and advantages will become apparent upon reading the following detailed description, while referring to the attached drawings which is an electrical schematic diagram illustrating a redundant power supply system embodying the present invention.

BRIEF DESCRIPTION OF THE DRAWING

The sole FIGURE is a schematic circuit diagram of two power supplies 10 and 12 connected to a common load 14.

DESCRIPTION OF THE PREFERRED EMBODIMENT

Broadly stated, and referring to the drawing, there is shown two power supplies 10 and 12, indicated generally within the dotted lines, each of which is connected to a common load 14 through respective high potential load conductors 16 and 18 and low potential load conductors, 20 and 22. Thus, each of the power supplies 10 and 12 is adapted to supply full load powers to the load 14, and provide uninterrupted service even if one of the power supplies becomes inoperative.

Each of the power supplies 10 and 12 is similarly constructed and, accordingly, power supply 10 is described in greater detail herein, with substantially similar components in power supply 12 being given the same numbers with prime designators. The power supply 10 has input terminals 24 and 26 into which a D.C. input is supplied by a source (not shown).

Referring now to the drawing there is illustrated a D.C. to D.C. converter for deriving a regulated 12 volt output from a 50 volt D.C. source. Transistor Q1 is a power switch controlling the power applied to the primary of transformer T1. When Q1 is conducting, energy is stored magnetically in transformer T1 which is designed to have the properties of a linear inductor. When transistor Q1 stops conducting, the secondary voltage of transformer T1 reverses polarity and through diode CR1 discharges the stored energy into the filter consisting of capacitor C2, capacitor C3, and inductor L1 and then to the load.

When 50 volt D.C. is initially applied to the input terminals 24 and 26, capacitor C1 is initially charged to the potential of source. Then a current from terminal 24 via resistor R1, the base to emitter path of transistor Q3, the base to emitter path of transistor Q2, resistor R2, the base to emitter path of transistor Q1 to terminal 26 and the source begins to flow. This current drives transistors Q1 into saturation as a current path is completed from terminal 24, winding W1 of transformer T1, the collector to emitter path of transistor Q1 to terminal 26 and the source. The mark at one end of each winding of transformer T1 indicates a like polarity, thus, with the marked end of winding W1 at a relatively positive potential the marked end of winding W2 will also have a relatively positive potential, this will via diode CR3 and the collector to emitter path of transistors Q2 and Q3 enhance the current flow to the base of transistor Q1 to cause it to continue to increase its current flow. The level to which this build-up of current will continue is limited by the source voltage and the adjustment of resistor R2.

The collector current of transistor Q1 is increasing linearly with time as shown by the following approximate relationship:

$$I_c{}^1 = \frac{E_{in}}{L_p} t,$$

where $I_c{}^1$ is the collector current of transistor Q1, $E_{in}$ is the input voltage, and $L_p$ is the primary inductance of transformer T1.

The maximum base current applied to transistor Q1 is limited by the value of resistor R2. The collector current will continue to increase until the point where the base current is no longer sufficient to maintain Q1 in saturation. The polarity of the transformer windings will now reverse, removing collector currents from Q2 and Q3 and effectively turning off transistor Q1.

When the polarity of transformer winding W2 reverses diode CR1 will conduct, applying reverse potential to the base of Q1, further limiting the conductivity of transistor Q1.

During the period of time Q1 is on there is no output to the load due to the polarity of diode CR1. When Q1 is off the transformer field collapses, reversing the voltage across winding W3 allowing the transformer to discharge its stored energy through diode CR1 into the output filter composed of capacitors C1 and C2 and inductor L1 to the load 14 via conductor 16 for the positive side and resistor R8, OR-ing diode CR6 and conductor 20 for the negative side.

Because of the charge-discharge type of operation, the transformer T1 acts as a current limited source during discharge. For a capacitive filter, the output ripple will be lower than for a source which is not current limited. The output ripple for a capacitive filter may be calculated from the following equation:

$$\Delta e_o = \frac{1}{C} \left[ \frac{E_{in}}{a L_p} t_{on} t_{off} + I_L \left| t_{on} - t_{off} \right| \right]$$

where
$\Delta e_o$ is the peak-to-peak output ripple voltage,
$c$ is the output capacitance, and
$I_L$ is the output load current.

From the above, it will be observed that the input conditions ($E_{in}$) see primarily a choke-input filter and the output conditions ($I_L$) see a capacitive filter. Also $T_{off}$ may be set equal to $t_{on}$ to obtain a minimum ripple with respect to $T_{off}$. For $T_{on}$ equal to $T_{off}$, the equation becomes:

$$P_o = \frac{n}{8f} \frac{E_{in}{}^2}{L_p}$$

-continued $$\text{where } f = \frac{1}{t_{on} + t_{off}}$$

Thus the power delivered to the load is inversely proportional to the output frequency. By varying the base current to transistor Q1 its on time will vary on the basis of $1/2f$. The output power will then also be linearly varied. This may be demonstrated by addition of a series resistance $R_x$ (not shown) to R1. The output power will depend on $R_x$ as follows:

$$P_o = \frac{B_1}{4} E_{in}{}^2 \frac{1}{R1 + R_x}$$

where $R_x$ is the control resistance.

In the disclosed circuit configuration, transistor Q4 will provide this necessary control resistance. Transistor Q4, in turn, is controlled by an error detector via the optical coupler OC1.

The error detector consists of a differential amplifier. The differential amplifier senses the voltage at the output terminals and compares it with a constant voltage to provide a corrective current via the feedback loop. The differential amplifier consists of transistors Q5 and Q6 with their emitters connected together and via resistors R7 to the negative output end of winding W3. Transistor Q6 has its base connected to the positive output lead 16 via resistor R9 and via zener diode CR5 and resistor R8 to the negative output end of winding W3 to provide a relatively constant reference potential. The collector of transistor Q6 is connected directly to the positive output conductor 16. Transistor Q5 has its base connected to the junction of resistors R5 and R6 of a voltage divider consisting of resistors R4, R5 and R6 connected between the positive and negative outputs of the filter. The collector of transistor Q5 is connected via the diode of the optical coupler OC1 to the positive output conductor 16.

Basically, should the voltage at the output terminals rise high enough that the Q5 base rises higher than the fixed reference (ignoring R8) voltage at Q6 base the conduction increases in the Q5 collector to emitter path and signals the shunt regulator transistor Q4 via the feedback path including OC1 to cause a smaller voltage drop across the shunt regulator, transistor Q4, thus to maintain a constant output voltage across the output terminals.

Now if the output current increases, there will be a finite voltage drop across resistor R8, causing an increase in the reference voltage level provided by CR5 to the base of transistors Q6. Note, diode CR6 a hot carrier diode was chosen because of its low forward resistance, but it still has a drop in voltage across it that varies with output current. This will cause transistor Q6 to draw more current and transistor Q5 to draw less current. This decreased current is coupled via OC1 to transistor Q4. Transistors Q3 and Q2 draw more current, which increases the current drawn by transistor Q1, which in turn allows a greater energy build up in the transformer T1 magnetic field. This causes the output to build up until transistor Q5 is in balance with transistor Q6. Thus by the use of resistor R8 in the reference arm of the differential amplifier, the output is maintained at a proper level and compensated for the possible lead drops as well as the OR-ing rectifiers without the drawbacks of remote sensing, where, should one power supply output drop to a low value, this condition would leave the output bus with very little indication because the other good supply would hold up the bus voltage.

Silicon controlled rectifier SCR1 is connected across the supply output to protect it should the power supply output increase in voltage beyond its normal range, then the crowbar circuit consisting of SCR1 and zener diode CR4 will cause the firing of SCR1 resulting in a drop in the output voltage.

Resistors R3 and R3' along with potentiometer R10 are used to individually margin the voltage down on each power supply while the other power supply continues to carry all the load, voltage is monitored across the load and ahead of each OR-ing rectifier during this time of maintenance. After this, R10 is re-adjusted to its middle position, effectively out of the circuit.

What is claimed is:

1. A direct current potential regulated power supply system to which a load can be attached comprising: first and second D.C. power supplies for parallel connection to the load; each of said supplies including voltage regulating means and a first and second load lead to which the load conductors can be attached; a first diode means connected in said second load lead of each of said supplies so that the diode is biased into conduction when voltage is applied to the load through the load conductors, a control circuit for each of said supplies for sensing the output voltage and for regulating the voltages of each of said supplies comprising a differential amplifier including a first transistor having a base, an emitter, and a collector connected to said first load lead, a first resistor and a zener diode in series connected between said first and said second load lead before said first diode means, said first transistor base connected between said first resistor and zener diode, a second resistor, a variable resistor and a third resistor in series connected between said first load lead and said second load lead, a second transistor having an emitter, a base connected between said variable resistor and said third resistor, and a collector connected to said voltage regulating means, said emitters of said first and second transistors connected together and via a fourth resistor to said second load lead, and a fifth resistor connected in series in said second load lead before said first diode means to sense an increase in output current to cause an increase in output voltage, and further including a potentiometer having a first and a second end terminal connected respectively between said second resistor and said variable resistor of said first and second power supply, and a tap terminal connected to said first load lead to increase the output of one of said supplies while decreasing the output of the other dependent upon the position of said tap along said potentiometer.

2. A direct current potential regulated power supply system as claimed in claim 1, wherein each of said power supplies includes a silicon controlled rectifier means having an anode connected to one of said load leads and a cathode connected to the other load lead, and a control terminal connected to the anode via a reference diode so that when the voltage level of said supply exceeds a predetermined value, said reference diode conducts current to trigger said silicon controlled rectifier into conduction to decrease said output voltages to a low value and said first diode means is reversed biased to thereby isolate said one power supply from said load.

* * * * *